United States Patent [19]
Moriya et al.

[11] 3,967,058
[45] June 29, 1976

[54] TWO WIRES TIME SHARING TWO WAY FULL DUPLEX COMMUNICATION SYSTEM

[75] Inventors: Takao Moriya; Kazuo Murano; Syunji Fujikawa, all of Kawasaki, Japan

[73] Assignee: Fujitsu Ltd., Japan

[22] Filed: Nov. 11, 1974

[21] Appl. No.: 522,693

[30] Foreign Application Priority Data
Nov. 12, 1973   Japan ............................... 48-126923

[52] U.S. Cl. ................................................ 178/58 R
[51] Int. Cl.² ......................................... H04L 5/14
[58] Field of Search ................. 178/58 R, 58 A, 68; 343/178; 179/15 A, 15 AL, 15 AQ, 15 BA, 15 AD, 15 BY, 15 AT

[56] References Cited
UNITED STATES PATENTS
3,542,956   11/1970   Sekimoto ........................... 179/15 A
3,688,036   8/1972    Bland .................................. 178/68

Primary Examiner—Thomas A. Robinson
Attorney, Agent, or Firm—Staas & Halsey

[57] ABSTRACT

The system according to the present invention carries out two way communication of a digital signal between a master terminal having its own clock source and a slave terminal, which is synchronized with the clock of the master terminal. The master terminal sends a digital signal originating from its own clock to the slave terminal and the slave terminal in turn sends a digital signal based on a clock signal which is derived from the received digital pulse from the master terminal.

8 Claims, 10 Drawing Figures

TWO WIRES TIME SHARING TWO WAY FULL DUPLEX COMMUNICATION SYSTEM

BACKGROUND OF THE INVENTION

The present invention relates to a communication system which is able to carry out full duplex communication of a digital signal.

For the purpose of carrying out said two way digital signal communication, either a semiduplex communication system or a full duplex communication system are conventionally used. The former commonly utilizes a pair of wires for two way transmission, however it cannot undertake simultaneous two way communication since the flow of information is always one way. The latter can communicate two ways at the same time, for example, by frequency dividing a pair of wires and converting the digital signal into an amplitude-shift keying signal (ASK), a phase-shift keying signal (PSK), a frequency shift keying signal (FSK) or other similar techniques.

However, the above mentioned frequency divided full duplex communication system requires a modulation and a demodulation apparatus, and is best suited for large scale communications.

It would be economically inconvenient to utilize said system in small scale communications.

SUMMARY OF THE INVENTION

An object of the present invention is to provide a two wire time sharing two way full duplex digital signal communication system used for relatively small scale communication and constituting a relatively simple low-cost circuit.

For achieving the above-mentioned object, the system according to the present invention carries out two way communication of the digital signal between a master terminal having its own clock source and a slave terminal synchronized with the clock of the master terminal. The master terminal sends a digital signal based on its own clock, to the slave terminal, and the slave terminal sends a digital signal based on a clock signal derived from the received digital pulse sent from the master terminal.

Furthermore, two way simultaneous communication is accomplished by transmitting each bit alternately from the master terminal and the slave terminal.

Further features and advantages of the present invention will be apparent from the ensuing description with reference to the accompanying drawings; to which, however, the scope of the invention is in no way limited.

DETAILED DESCRIPTION OF THE DRAWINGS

Figure 1:
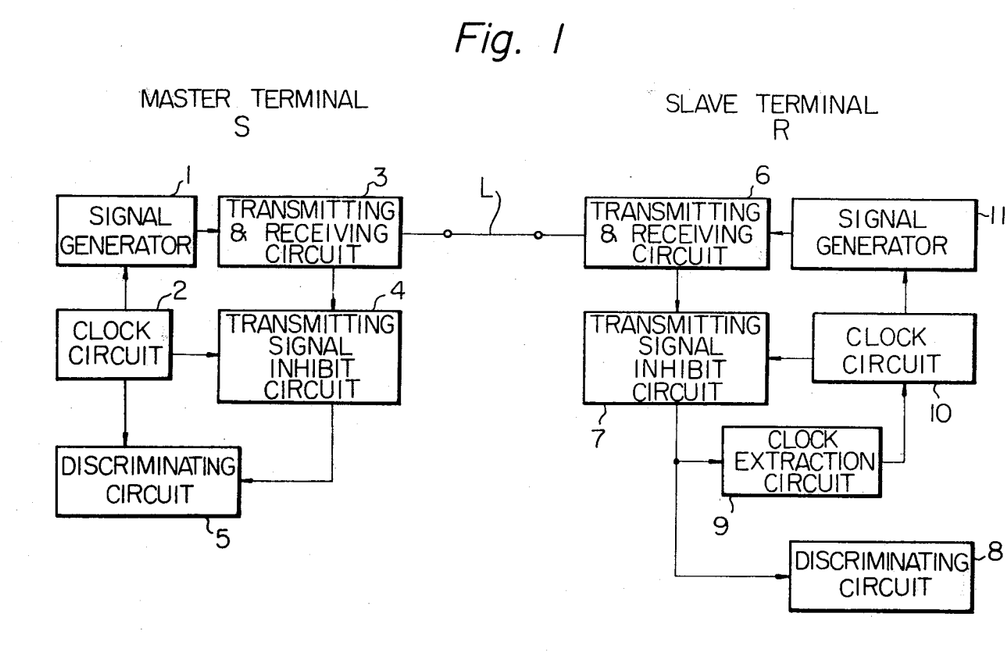
FIG. 1 is a block diagram showing a function of the system according to the present invention.

Referring to FIG. 1, which shows the block diagram of one embodiment according to the present invention, a master terminal S and a slave terminal R are connected via a transmission line L. In the master terminal S, a signal generator 1 generates a non-return to zero (hereinafter called NRZ) digital information signal with a constant bit rate. The timing of this constant bit rate is determined by a clock signal from clock circuit 2. The digital output signal of the signal generator 1 is supplied to a transmitting and receiving circuit 3 which modulates said digital output signal into a return to zero (whereinafter called RZ) pulse having narrow pulse width and sends said RZ pulse to the transmission line L. At the same time, said transmitting and receiving circuit 3 transfers a signal to a transmitting signal inhibit circuit 4. The transmitting signal inhibit circuit 4 prevents the transmitting digital signal which comes from the signal generator 1 from flowing into discriminating circuit 5. The transmitting signal inhibit circuit 4 operates with the clock signal from the clock circuit 2.

In the slave terminal R, a transmitting and receiving circuit 6 introduces via a transmitting signal inhibit circuit 7 a received RZ pulse to a discriminating circuit 8. At the same time, the output RZ pulse from the transmitting signal inhibit circuit 7 is sent to a clock extraction circuit 9, where the clock signal is extracted. The extracted clock signal is sent to a clock circuit 10 which forms a slave clock signal for sending a digital signal from a signal generator 11 and a slave clock signal for the transmitting signal inhibit circuit 7. In the slave terminal R, the slave clock signals are formed based on the digital signal sent from the master terminal S. As mentioned above, the characteristic feature of the present invention is that the transmitting of the digital signal from slave terminal R is restricted by the slave clock signal, which is obtained from the RZ signal transmitted by the master terminal S. This makes it possible for a time sharing full duplex communication system based on bit units using digital signals.

Figure 2:
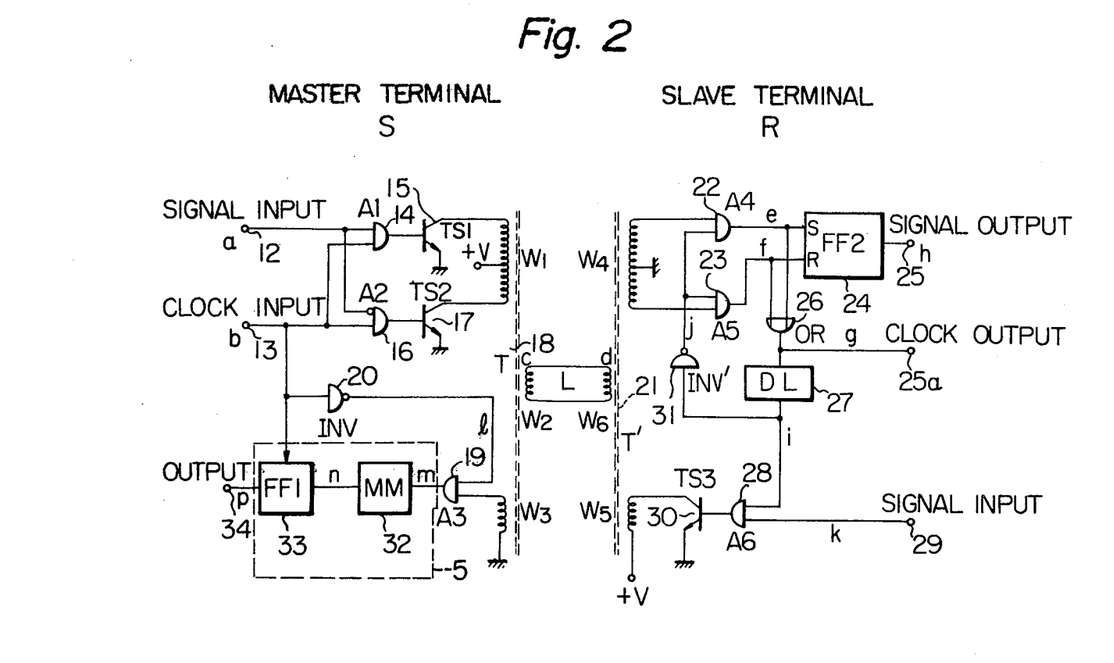
FIG. 2 is a circuit diagram of the system according to one embodiment of the present invention.
Figure 3:
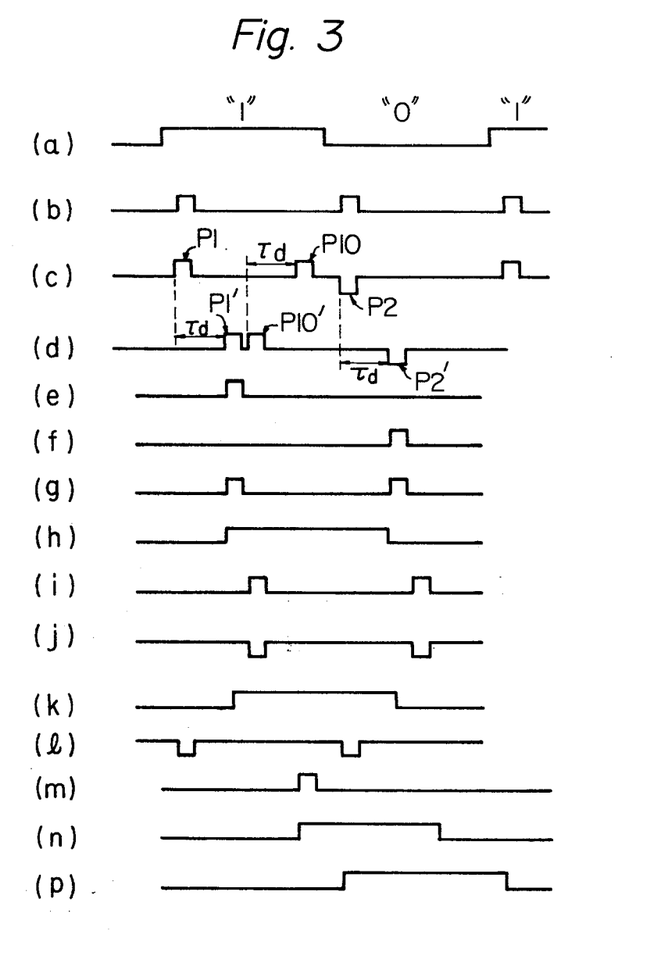
FIG. 3 is a simplified representation of waveforms occurring in the operation of the circuit shown in FIG. 2.

Next, we will explain in detail the circuit based on the block diagram shown in FIG. 1. FIG. 2 is one embodiment of the circuit based on the block diagram shown in FIG. 1, and FIG. 3 is a time chart showing the functioning of the circuit of FIG. 2. Referring to FIG. 3, alphabetic characters shown on the left side of each waveform correspond to each point marked by alphabetic characters in FIG. 2.

The NRZ signal, as shown in (a) of FIG. 3, is supplied by the signal generator 1 in master terminal S to a signal input terminal 12 shown in FIG. 2; and a clock signal, as shown in (b) of FIG. 3, is supplied by clock circuit 2 to a clock input terminal 13 shown in FIG. 2. FIG. 3, (a) shows a case where the output of the signal generator 1 is "1"-"0"-1. When the NRZ signal in the input terminal 12 of FIG. 2.is 1, an AND gate A1 (14) is actuated, current flows through transistor TS1 (15) when an input clock (b) shown in FIG. 3, is a high level 1. While the NRZ signal in the input terminal 12 is 0, AND gate A2 (16), having an inhibit gate input port, is actuated and current flows through transistor TS2 (17), when an input clock (b) shown in FIG. 3, is a high level 1. The outputs of the transistor TS1 (15) and the transistor TS2 (17) are connected to both end terminals of a coil W1 of a transformer T and the center tap of the coil W1 is connected to a voltage source. Therefore, a signal shown in (c) of FIG. 3 appears at a coil W2 and is transmitted on a transmission line L. Referring to (c) of FIG. 3, when the NRZ signal at the input terminal 12 is 1 a pulse P1 originates, and when the NRZ signal at the input terminal 12 is 0, a pulse P2 having an opposite polarity with respect to the pulse P1 originates at coil W2; i.e., (c) of FIG. 3 is a dipolar RZ signal. Therefore, the signal which is transmitted by the master terminal S on the transmission line always provides timing information, and as mentioned hereinafter, the slave terminal R can extract the slave clock signal using a very simple circuit.

When the pulse signal is transmitted by the master terminal S, a sending pulse signal also appears at coil W3 of the transformer. However, the sending pulse signal from master terminal S, at the coil W3 is not introduced into the discriminating circuit 5, because AND gate A3 (19) is inhibited by an output signal (l) from an inverter INV (20) regulated by the master clock signal (b) of FIG. 3. The dipolar RZ signal which is transmitted via the transmission line L is delayed for a propagation delay time $\tau d$ before reaching the slave terminal R, and as shown in (d) of FIG. 3, pulses P1' and P2', which have a time delay of $\tau d$ with respect to pulses P1 and P2, appear at coil W6 of transformer T' of slave terminal R. The center tap of a coil W4 of the transformer T' is grounded. Therefore, a signal having the waveform as shown in (d) of FIG. 3 and a signal having an opposite polarity, to (d) of FIG. 3, appear respectively at each end terminals of coil W4. The signals appearing at both end terminals of coil W4 are inhibited by the timing of a control clock pulse as shown in (j) of FIG. 3, and outputs (e) and (f) of FIG. 3 appear at the output terminals of AND gates A4 (22) and A5 (23) respectively. These outputs are further supplied to the set and reset terminals of a flip-flop circuit FF2 (24). Therefore, a NRZ signal as shown in (h) of FIG. 3 appears at a signal output terminal 25, that is, the NRZ signal from the signal generator 1 of master terminal S is recovered and appears at the signal output terminal 25.

The outputs of the AND gates A4 (22) and A5 (23) are supplied to an OR gate 26, and a slave clock signal (g) of FIG. 3 appears at output terminal 25a. As has already been mentioned, master terminal S transmits a dipolar RZ signal, therefore slave terminal R can easily extract a slave clock signal. The slave clock signal (g) of FIG. 3 is set to an AND gate A6 (28) via a delay circuit DL (27). The delayed slave clock signal of the delay circuit DL (27) is shown in (i) of FIG. 3. Therefore, when a NRZ signal (k) of FIG. 3 to be transmitted from the slave terminal R to the master terminal S is present at terminal 29, its delayed slave timing is restricted by the output clock signal (i) of FIG. 3. The delayed slave clock signal (i) is supplied by delay circuit DL (27) to the AND gate A6 (28). The signal transmitted from slave terminal R to master terminal S is a unipolar RZ signal. Said unipolar RZ signal P10; shown in (d) of FIG. 3, is sent via coil W5 of the transformer T' (21) to the transmission line L, only when: the NRZ signal (k) of FIG. 3 at the signal input terminal (29) is 1; the delayed clock signal (i) is a high level 1 the AND gate A6 (28) is actuated, causing current to flow through transistor TS3 (30). As is clear from the above mentioned explanation, the delay time of the delay circuit DL (27) should be larger than the width of the RZ pulse received from the master terminal S.

The output (i) of the delay circuit DL (27) is also supplied to an invertor INV' (31). The output of the invertor INV' (31) is shown in (j) of FIG. 3, and is supplied to inhibit operation of the AND gates A4, A5 (22, 23). Therefore, the AND gates A4, A5 (22, 23) and A6 (28) do not open at the same time, and the slave transmitting RZ signal P10', which is supplied to a coil W5 of the transformer T' (21) is prohibited from reaching the signal output terminal 25 via the inhibited AND gates A4, A5 (22, 23).

The transmitted slave RZ signal P10' appears, after the delay time $\pi d$, at coil W3 of the transformer T (18) of master terminal S as the received signal P10 shown in (c) of FIG. 3. In FIG. 2, the discriminating circuit 5 of the master terminal S is composed of the AND gate A3 (19), a monostable multivibrator MM (32) and a flip-flop circuit FF1 (33). The AND gate A3 (19) is opened by the output of the invertor (20), shown in (l) of FIG. 3. When RZ signal P10 is received from slave terminal R, the output of the AND gate A3 (19) shown in (m) of FIG. 3, is converted by the monostable multivibrator MM (32) to a unipolar RZ signal having a duty ratio almost equal to 1. The output of MM (32) is shown in (n) of FIG. 3. The output of the monostable multivibrator MM (32) is applied to the flip-flop FF1 (33). The master clock signal (b) in FIG. 3 is also applied to FF1 (33) and the output signal is the recovered NRZ signal shown as (p) of FIG. 3. The signal (p) is present at the output terminal 34 of master terminal S.

As shown above, the slave clock signal of slave terminal R is extracted from the signal received from the master terminal S, and the transmitted signal from the slave terminal R is restricted by the delayed slave clock signal of slave terminal R. Therefore, in master terminal S and slave terminal R, their respective transmitting and receiving signals do not direct the operation of the discriminating circuit at the same time, and two way full duplex communication can be achieved by transmitting each bit alternately from the master terminal S and the slave terminal R.

Figure 4:
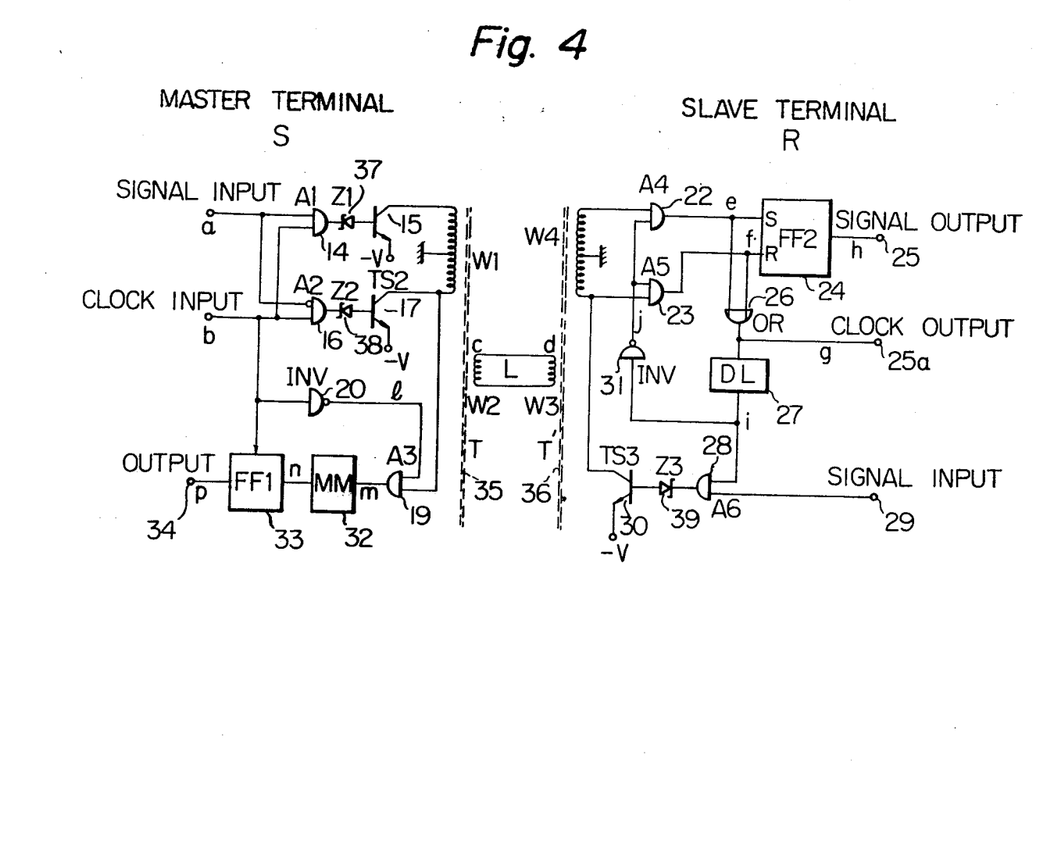
FIG. 4 is a modification of the circuit of FIG. 2.

FIG. 4 is a modified embodiment of the circuit shown in FIG. 2. Referring to FIG. 4, similar waveforms form at the points shown by characters (a)-(p) corresponding to those shown in FIGS. 2 and 3. The function of the circuit shown in FIG. 4 is the same as the circuit shown in FIG. 2. In the embodiment shown in FIG. 2, signals having similar waveform appear at the coils W1 and W3 of the transformer T (18) and at the coils W4 and W5 of the transformer T' (21). Therefore, the coils W1 and W3, and coils W4 and W5 respectively can be combined and used as one coil. In FIG. 4, transformers 35 and 36 are used. In these transformers 35 and 36, coil W3 of the transformer T and coil W5 of the transformer T' in the FIG. 2 are omitted and the construction of the transformers is simplified. In this case, a center tap of the coil W1 of the transformer T (35) is grounded, and level shifting zener diodes Z1 (37) and Z2 (38) are inserted between the AND gate A1 (14) and the transistor TS1 (15) and between AND gate A2 (16) and the transistor TS2 (17) respectively. In the slave terminal R, the collector of the transistor TS3 (30) is connected to the coil W4 of the transformer 36. The emitter of the transistor TS3 (30) is connected to a voltage source and a level shifting zener diode Z3 (39) is inserted between the AND gate A6 (28) and the base of the transistor TS3 (30).

Figure 5:
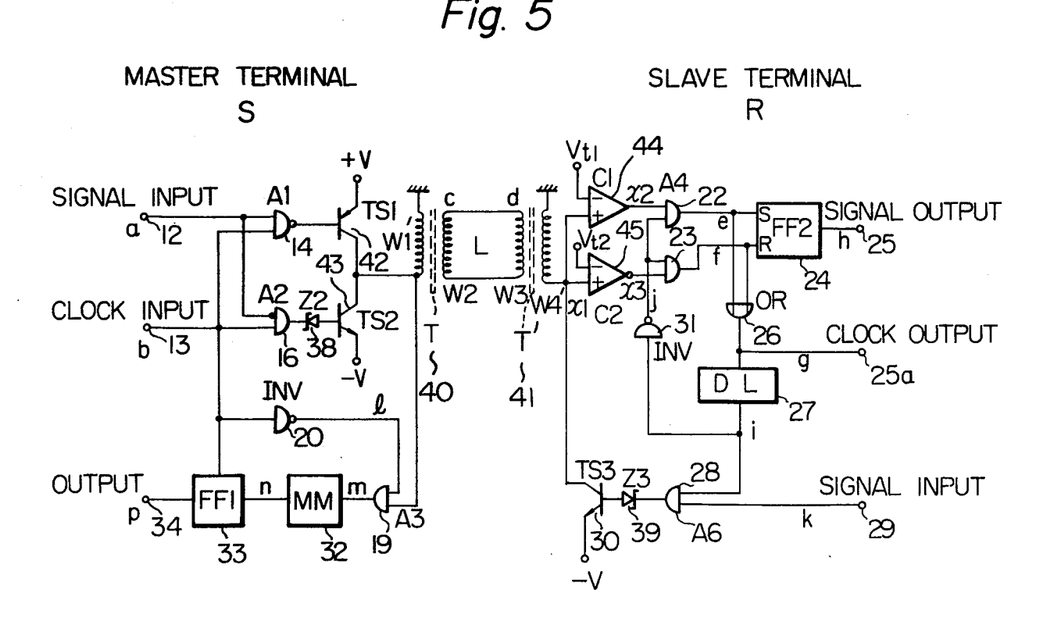
FIG. 5 is another modification of the circuit as shown in FIG. 2.

FIG. 5 is another modified embodiment of the circuit shown in FIG. 2. Referring to FIG. 5, similar waveforms at the points shown by characters (a)-(p) are obtained, as shown in FIG. 2 and FIG. 3. The function of the circuit shown in FIG. 5 is similar to the circuit shown in FIG. 2. Points of difference between the circuits FIG. 2 and FIG. 5 are described below. As in FIG. 2, the coils W1 and W3 of transformer T (18) and the coils W4 and W5 of the transformer T' (19) are commonly used. Therefore, since the signals appearing at two end terminals of coils W1 and W2 have opposite polarity with respect to each other, the coils W1, W3, W4 and W5 shown in FIG. 2 can be simplified to coils W1' and W4' of the transformers 40 and 41 as shown in FIG. 5. However, in FIG. 5 a driving circuit in the master unit for driving the dipolar RZ pulse is composed of a combination of a PNP transistor TS1 (42) and a NPN transistor TS2 (43); and the receiving circuit of the slave unit is composed of comparator circuits C1 (44) and C2 (45) having variable threshold terminals Vt1 and Vt2, respectively.

Figure 6:
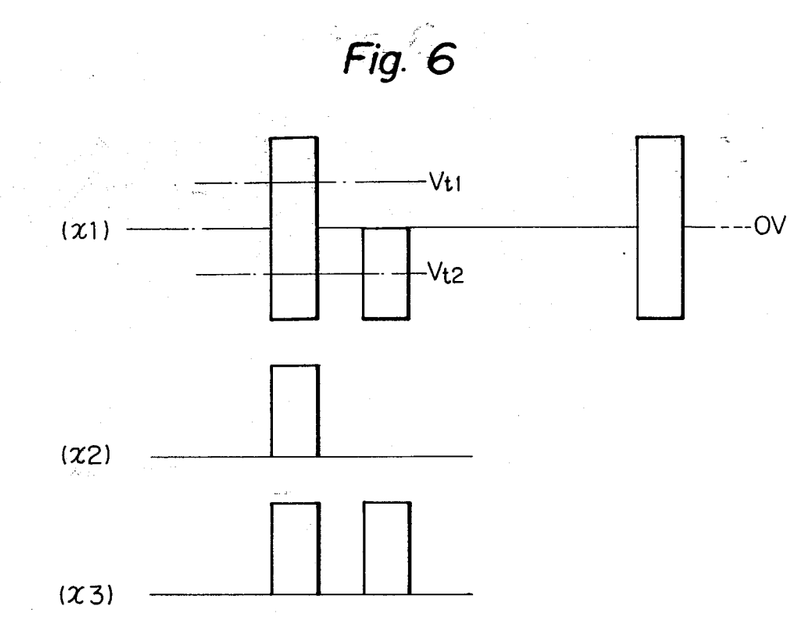
FIG. 6 is a simplified representation of waveforms occurring in the operation of the circuit shown in FIG. 5.

Next, we will explain the function of the comparator circuits C1 (44) and C2 (45). One example of similar waveforms, at points $x1$, $x2$ and $x3$ in FIG. 5 is shown in FIG. 6. A dipolar pulse signal, shown as ($x1$) in FIG. 6 is received at a point $x1$ in FIG. 5, and supplied to the comparator circuit C1 (44) and C2 (45), where the threshold value is set at $V_{t1}$ and $V_{t2}$. Signal waveforms, shown as ($x2$) and ($x3$) in FIG. 6, appear at the output of the comparator C1, C2 (44, 45) and are applied to AND gates A4, A5 (22, 23). Hereinafter, the operation similarly follows that explained in FIG. 2.

Figure 7:
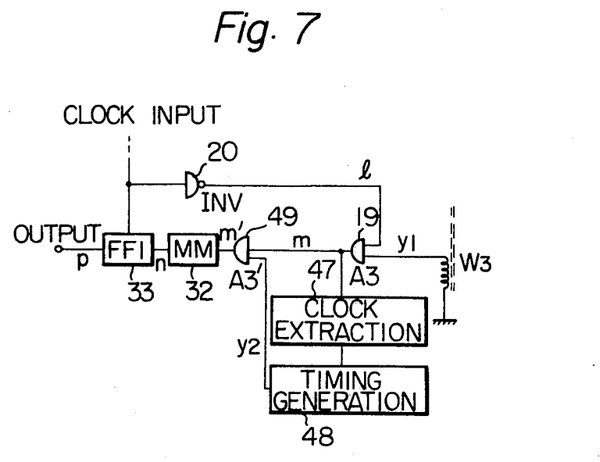
FIG. 7 is one embodiment for improving the characteristics of the discriminating circuit shown in FIGS. 2, 4 and 5.
Figure 8:
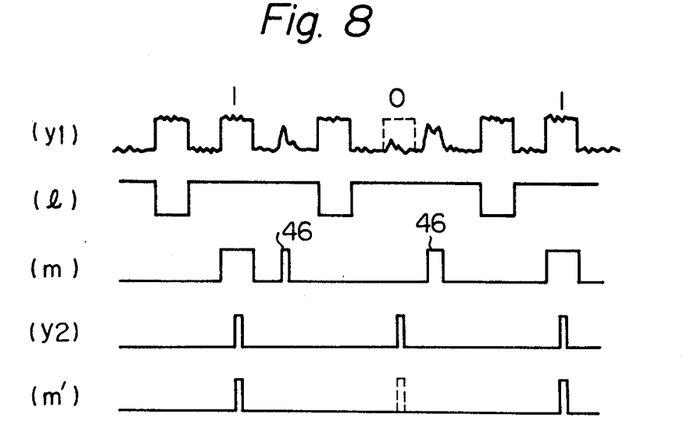
FIG. 8 is a simplified representation of waveforms occurring in the operation of the circuit shown in FIG. 7.

FIG. 7 shows one embodiment of the circuit for improving characteristics of the discriminating circuit shown in FIGS. 2, 4 and 5; and FIG. 8 shows signal waveforms in several parts of FIG. 7. Referring to FIGS. 2, 4 and 5, the amplitude of an input signal having a noise component shown as (y1) in FIG. 8 is discriminated by the AND gate A3 (19), and the output (m) of the AND gate A3 (19) is directly applied to the monostable multivibrator MM (32). Therefore, the input noises may produce the error output signal 46 shown as (m) in FIG. 8. In the embodiment shown in FIG. 7, discriminator clock signal is extracted by clock extraction circuit 47, using a tuning circuit or a locking oscillator from output (m) of the AND gate A3 (19). A timing waveform, shown as (y2) in FIG. 8, is supplied to the gate A3' (49). Thus, the output (m) of the AND gate A3 (19) is discriminated at the correct timing and output (m') of FIG. 8 is obtained at the output of the gate A3' (49). In the waveform (m') of FIG. 8, the effect of the noise is suppressed. It is understood that although above-mentioned explanation is given with respect to master terminal S, the same improvements can be carried out with respect to slave terminal R.

Figure 9:
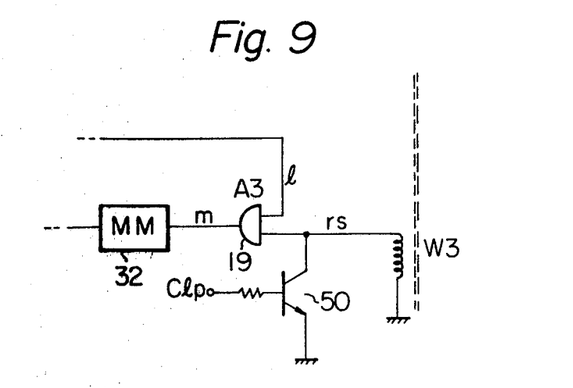
FIG. 9 is another embodiment for improving the characteristics of the discriminating circuit shown in FIGS. 2, 4 and 5.
Figure 10:
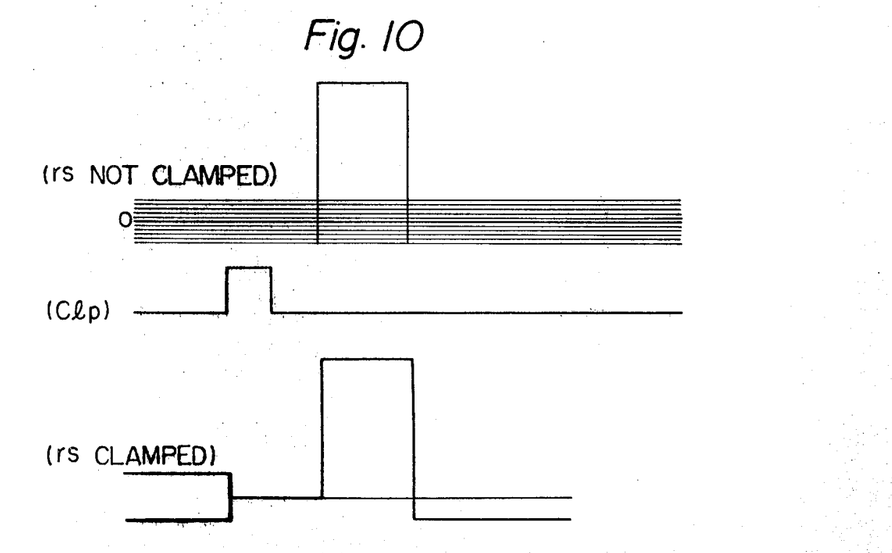
FIG. 10 is a simplified representation of waveforms occurring in the operation of the circuit shown in FIG. 9.

FIG. 9 shows another embodiment of the circuit for improving characteristics of the discriminating circuit shown in FIGS. 2, 4 and 5. In the full duplex transmission system, according to the present invention, signal pattern is not restricted. Therefore, a signal having direct current components may be transmitted. That is, a receiving signal at point rs in FIG. 9 has a direct current component, as shown by (rs not clamped) in FIG. 10, and the operating margin decreases. The operating margin is increased by clamping the input level when the receiving or transmitting signal is not expected. For example, referring to FIG. 9, the input rs of the AND gate A3 (19) is grounded at the time shown as (clp) in FIG. 10. Therefore, the waveform at point rs is shown as (rs clamped) in FIG. 10, thereby increasing the operating margin at the receiving time; and preventing the variation of the direct current component from affecting the following receiving signal. This effect may be considerably increased by combining the improvements shown in FIG. 7 and FIG. 9.

In the abovementioned explanation, as shown in the time chart of FIG. 3, a delay time $Td$ in the transmission line L is selected to be much shorter than the repetition period of the signal. However, it may be lengthened under conditions such that a pulse sequence (down pulse series), which is sent from master terminal S to slave terminal R, and a pulse sequence (up pulse series), which is sent from slave terminal R to master terminal S, do not encounter each other at the points (c) and (d) in FIG. 2. These points of contact can be adjusted by changing the delay time in the delay circuit DL (27) in the slave terminal R.

Further, the above-mentioned explanation refers to the case where the dipolar RZ pulse is utilized in the down pulse series for the purpose of maintaining the timing information. However, it is understood that any pulse can be used if the clock is extracted from the receiving signal in slave terminal R.

Further, the above-explanation is given in the case of the AND gates being utilized at the input of the discriminating circuit. However, by using an equalizer circuit, which compensates for distortion in the transmission line and a high sensitivity comparator synchronized with the clock signal in the discriminating circuit, this system is also applicable to long distance transmission.

Further, since the transmission line and the transmitting and receiving circuit are separated by the transformer, it goes without saying that the electrical power can be fed from master terminal S to slave terminal R by superimposing the direct current on the transmission line.

It will be apparent that many modifications and variations may be effected without departing from the scope of novel concepts of this invention. Therefore, it is intended by the appended claims to cover all such modifications and variations which fall within the true spirit and scope of the invention.

What is claimed is:

1. A two wire time sharing two-way full duplex communication system between master and slave terminals, comprising:
a master terminal including a first transformer means, a master clock signal generating means for generating a repetitive pulse timing signal, a master digital signal generating means for receiving said repetitive pulse timing signal and for providing a master transmitting dipolar RZ pulse signal synchronized with said repetitive pulse timing signal, a master transmitter means being connected to said first transformer means for transmitting said master transmitting pulse signal, and a master receiving means being connected to said first transformer means for receiving signals from said slave terminal and including a master discriminator means;

a slave terminal including a second transformer means, a slave receiving means being connected to said second transformer means for receiving and rectifying said master transmitting pulse signal, a slave clock extracting circuit means for extracting a slave timing signal from said received master transmitting pulse signal, a slave digital signal generating means for providing a dipolar RZ slave transmitting pulse synchronized with said slave timing signal, and slave transmitting means being connected to said second transformer means for transmitting said slave transmitting pulse signal;

a two wire transmission line means, a first end of which is connected to said first transformer means of said master terminal, and the second end of which is connected to said second transformer means of said slave terminal; whereby, said master terminal and said slave terminal alternately transmit one bit of digital signal on said transmission line means to achieve simultaneous two way communication.

2. The system according to claim 1, wherein said master discriminator means includes:

a discriminator clock extraction circuit for generating a discrimination clock signal in response to the characteristics of said received slave transmitting pulse signal;

a discrimination timing generation circuit for generating a discrimination timing signal with a constant period and a pulse width smaller than said discrimination clock signal;

wherein said master discrimination means is actuated by said discrimination timing signal allowing said master receiver means to pass said received slave transmitting pulse signal.

3. A system according to claim 1, wherein said first transformer means of said master terminal has first, second and third coils and said second transformer means of said second terminal has fourth, fifth and sixth coils;

said master transmitter means being connected to said first coil, said master receiving means being connected to said second coil and said third coil having two terminals, each connected to a corresponding wire of said two wire transmission line means at said first end thereof;

said fourth coil having two terminals, each being connected to a corresponding wire at said second end of said two wire transmission line means;

said slave receiving means being connected to said fifth coil and including a slave discriminator circuit means for preventing said slave transmitting pulse signals from passing through said slave receiving means; and said slave transmitting means being connected to said sixth coil of said second transformer means.

4. A system according to claim 1, wherein said first transformer means of said master terminal has first and second coils and said second transformer means of said slave terminal has third and fourth coils;

said first coil having two end terminals and a center tap;

said master transmitting means being connected to said two end terminals of said first coil and said master receiving means being connected to one of said two end terminals;

said second coil having two end terminals being correspondingly connected to said first end of said two wire transmission line means;

said third coil having two end terminals being connected to said second end of said two wire transmission line means;

said fourth coil having two end terminals and a center tap whereby said slave receiving means is connected to said two end terminals of said fourth coil and said slave transmitting means is connected to one of said two end terminals;

and said slave receiving means including a second discriminator circuit means for preventing said slave transmitting pulse signals from passing through said slave receiving means.

5. The system according to claim 1, wherein said first transformer means of said master terminal has first and second coils and said second transformer means of said slave terminal has third and fourth coils;

said first coil having two end terminals; one of said two end terminals of said first coil being connected to a voltage means, and the other end terminal being commonly connected to said master transmitting means and said master receiving means;

sais second coil having two end terminals being connected to said first end of said two wire transmission line means;

said third coil having two end terminals being connected to said second end of said two wire transmission line means;

said fourth coil having two end terminals; one of said two end terminals of said fourth coil being connected to a constant voltage means and the other end terminal being commonly connected to said slave transmitting means and said slave receiving means;

and said slave receiving means including a second discriminator circuit means for preventing said slave transmitting pulse signal from passing through said slave receiving means.

6. The system according to claim 3, wherein at least one of said first and said second discriminator circuit means includes a clamping circuit means for clamping the direct current level during periods when no transmitted or received signals are present.

7. The system according to claim 4, wherein at least one of said first and said second discriminator circuit means includes a clamping circuit means for clamping the direct current level during the periods when no transmitted or received signals are present.

8. The system according to claim 5, wherein at least one of said first and said second discriminator circuit means includes a clamping circuit means for clamping the direct current level during the periods when no transmitted or received signals are present.

* * * * *

UNITED STATES PATENT AND TRADEMARK OFFICE
CERTIFICATE OF CORRECTION

PATENT NO. : 3,967,058
DATED : June 29, 1976
INVENTOR(S) : Moriya et al

It is certified that error appears in the above–identified patent and that said Letters Patent are hereby corrected as shown below:

Column 3, line 1, change "1" to --"1"--.
Column 3, line 4, change "1" to --"1"--.
Column 3, line 4, change "While" to --When--.
Column 3, line 4, change "0" to --"0"--.
Column 3, line 8, change "1" to --"1"--.
Column 3, line 15, change "1" to --"1"--.
Column 3, line 16, change "0" to --"0"--.
Column 4, line 5, change "1" to --"1"--.
Column 4, line 6, change "1" to --"1"--.
Column 4, line 64, change "coii" to --coil--.

Signed and Sealed this

Eighteenth Day of October 1977

[SEAL]

Attest:

RUTH C. MASON
Attesting Officer

LUTRELLE F. PARKER
Acting Commissioner of Patents and Trademarks